US012594463B2

(12) United States Patent
Lee

(10) Patent No.: US 12,594,463 B2
(45) Date of Patent: Apr. 7, 2026

(54) METHOD, DEVICE, AND NON-TRANSITORY COMPUTER-READABLE RECORDING MEDIUM FOR ESTIMATING INFORMATION ON GOLF SWING

(71) Applicant: MOAIS, INC., Seoul (KR)

(72) Inventor: Yong Geun Lee, Seoul (KR)

(73) Assignee: MOAIS, INC., Seoul (KR)

( * ) Notice: Subject to any disclaimer, the term of this patent is extended or adjusted under 35 U.S.C. 154(b) by 257 days.

(21) Appl. No.: 18/033,694

(22) PCT Filed: Sep. 29, 2021

(86) PCT No.: PCT/KR2021/013323
§ 371 (c)(1),
(2) Date: Apr. 25, 2023

(87) PCT Pub. No.: WO2022/102958
PCT Pub. Date: May 19, 2022

(65) Prior Publication Data
US 2023/0398408 A1 Dec. 14, 2023

(30) Foreign Application Priority Data

Nov. 16, 2020 (KR) ........................ 10-2020-0153063

(51) Int. Cl.
*A63B 24/00* (2006.01)
*A63B 71/06* (2006.01)
(Continued)

(52) U.S. Cl.
CPC ...... *A63B 24/0075* (2013.01); *A63B 71/0622* (2013.01); *G06T 7/70* (2017.01);
(Continued)

(58) Field of Classification Search
CPC ............ A63B 24/0075; A63B 71/0622; A63B 2102/32; A63B 2024/0012;
(Continued)

(56) References Cited

U.S. PATENT DOCUMENTS

2012/0040317 A1* 2/2012 Anderson .......... A63B 69/3623
473/409

FOREIGN PATENT DOCUMENTS

KR 101399655 B1 5/2014
KR 1020200115729 A 10/2020

* cited by examiner

*Primary Examiner* — Robert P Bullington
(74) *Attorney, Agent, or Firm* — Dinsmore & Shohl LLP; Yongsok Choi, Esq.

(57) ABSTRACT

A method for estimating information on a golf swing is provided. The method includes the steps of: specifying at least one analysis target posture from among a plurality of golf swing-related postures; detecting at least one of at least one joint of a user and a golf club using an artificial neural network model from a video of the user's golf swing captured by a video capture module, and providing the user with information on the user's analysis target posture estimated with reference to at least one of a position of the at least one joint and a position of the golf club; and controlling the video capture module to capture the video of the user's golf swing again after a predetermined time elapses from when the information on the analysis target posture is provided.

11 Claims, 5 Drawing Sheets

(51) Int. Cl.
  *G06T 7/70*          (2017.01)
  *G06V 10/82*        (2022.01)
  *G06V 40/20*        (2022.01)
  *A63B 102/32*       (2015.01)

(52) U.S. Cl.
  CPC .............. *G06V 10/82* (2022.01); *G06V 40/23*
      (2022.01); *A63B 2024/0012* (2013.01); *A63B*
          *2024/0068* (2013.01); *A63B 2071/063*
          (2013.01); *A63B 2102/32* (2015.10); *A63B*
      *2220/05* (2013.01); *A63B 2220/806* (2013.01);
              *G06T 2207/10016* (2013.01); *G06T*
          *2207/20084* (2013.01); *G06T 2207/30196*
          (2013.01); *G06T 2207/30221* (2013.01)

(58) Field of Classification Search
  CPC ...... A63B 2024/0068; A63B 2071/063; A63B
              2220/05; A63B 2220/806; G06T 7/70;
              G06T 2207/10016; G06T 2207/20084;
              G06T 2207/30196; G06T 2207/30221;
                      G06V 10/82; G06V 40/23
  See application file for complete search history.

100

FIG. 5A                          FIG. 5B
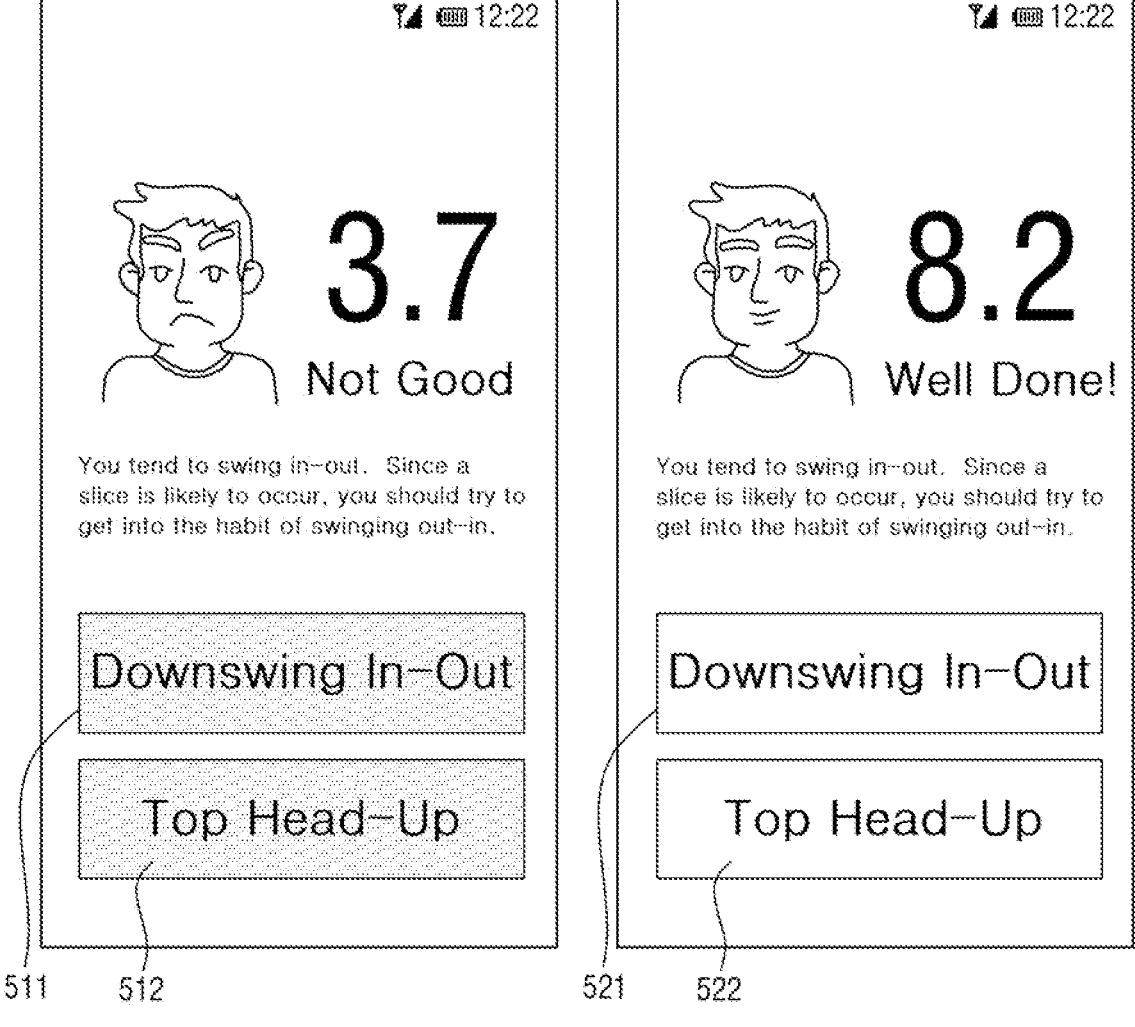
511      512                      521      522

METHOD, DEVICE, AND NON-TRANSITORY COMPUTER-READABLE RECORDING MEDIUM FOR ESTIMATING INFORMATION ON GOLF SWING

CROSS-REFERENCE TO RELATED APPLICATION(S)

This application is a national phase of Patent Cooperation Treaty (PCT) International Application No. PCT/KR2021/013323 filed on Sep. 29, 2021, which claims priority to Korean Patent Application No. 10-2020-0153063 filed on Nov. 16, 2020. The entire contents of PCT International Application No. PCT/KR2021/013323 and Korean Patent Application No. 10-2020-0153063 are hereby incorporated by reference.

FIELD OF THE INVENTION

The present invention relates to a method, device, and non-transitory computer-readable recording medium for estimating information on a golf swing.

BACKGROUND

As golf has become more popular in recent years, techniques for analyzing images of a golfer's swing and providing useful information to the golfer have been introduced.

As an example of related conventional techniques, Korean Laid-Open Patent Publication No. 2009-105031 discloses a golf clinic system employing image processing techniques and an operation method thereof, the system comprising: a plurality of markers attached to a body and a golf club of a golf practitioner; a plurality of cameras for collecting images of a swing motion of the golf practitioner; an image analyzer for reconstructing two-dimensional images collected from the plurality of cameras into three-dimensional images, extracting spatial coordinates of the markers according to movements, and analyzing angular values of parts of the body and data for each stage in real time to output a clinic result in a report format; and a database in which kinematic clinic information on the swing motion is matched with member information and stored as digital data.

However, according to the techniques introduced so far as well as the above-described conventional technique, it is necessary to separately use an expensive instrument for recognizing a golfer's posture and motion, or to attach separate sensors (or markers) to the golfer's body and golf club, in order to analyze the golfer's swing.

Meanwhile, during a swing practice, a golfer usually practices only a specific posture repeatedly depending on the purpose of the practice. For example, when practicing fixing a swing posture to prevent a head-up from occurring in his/her swing, the golfer watches a video of the swing after each swing to check whether a head-up has occurred or not. However, it would be very inconvenient for the golfer to check any problematic part (e.g., a frame at the moment of an impact that shows the occurrence of a head-up) in the video of his/her swing after each swing and then swing again.

SUMMARY OF THE INVENTION

One object of the present invention is to solve all the above-described problems in prior art.

Another object of the invention is to specify at least one analysis target posture from among a plurality of golf swing-related postures; detect at least one of at least one joint of a user and a golf club using an artificial neural network model from a video of the user's golf swing captured by a video capture module, and provide the user with information on the user's analysis target posture estimated with reference to at least one of a position of the at least one joint and a position of the golf club; and control the video capture module to capture the video of the user's golf swing again after a predetermined time elapses from when the information on the analysis target posture is provided.

Yet another object of the invention is to light-weight an artificial neural network model using depthwise convolution and pointwise convolution, and estimate at least one of at least one joint of a user and a golf club from a video of the user's golf swing using the light-weighted artificial neural network model.

The representative configurations of the invention to achieve the above objects are described below.

According to one aspect of the invention, there is provided a method comprising the steps of: specifying at least one analysis target posture from among a plurality of golf swing-related postures; detecting at least one of at least one joint of a user and a golf club using an artificial neural network model from a video of the user's golf swing captured by a video capture module, and providing the user with information on the user's analysis target posture estimated with reference to at least one of a position of the at least one joint and a position of the golf club; and controlling the video capture module to capture the video of the user's golf swing again after a predetermined time elapses from when the information on the analysis target posture is provided.

According to another aspect of the invention, there is provided a device comprising: an analysis target posture management unit configured to specify at least one analysis target posture from among a plurality of golf swing-related postures; an information provision unit configured to detect at least one of at least one joint of a user and a golf club using an artificial neural network model from a video of the user's golf swing captured by a video capture module, and provide the user with information on the user's analysis target posture estimated with reference to at least one of a position of the at least one joint and a position of the golf club; and a video capture module management unit configured to control the video capture module to capture the video of the user's golf swing again after a predetermined time elapses from when the information on the analysis target posture is provided.

In addition, there are further provided other methods and devices to implement the invention, as well as non-transitory computer-readable recording media having stored thereon computer programs for executing the methods.

According to the invention, it is possible to assist a user to repeatedly practice a desired posture, without the inconvenience of checking a video of his/her golf swing or manipulating a device after each golf swing, by specifying at least one analysis target posture from among a plurality of golf swing-related postures; detecting at least one of at least one joint of a user and a golf club using an artificial neural network model from a video of the user's golf swing captured by a video capture module, and providing the user with information on the user's analysis target posture estimated with reference to at least one of a position of the at least one joint and a position of the golf club; and controlling the video capture module to capture the video of the user's golf swing again after a predetermined time elapses from when the information on the analysis target posture is provided.

According to the invention, it is possible to light-weight an artificial neural network model using depthwise convolution and pointwise convolution, and estimate at least one of a position of at least one joint of a user and a position of a golf club from a video of the user's golf swing using the light-weighted artificial neural network model in a mobile device, thereby accurately and efficiently estimating information on the user's golf swing posture in the mobile device, without using any separate sensor or instrument.

BRIEF DESCRIPTION OF THE DRAWINGS

FIG. 5A illustratively shows how to provide information on a user's analysis target posture according to one embodiment of the invention.

FIG. 5B illustratively shows how to provide information on a user's analysis target posture according to one embodiment of the invention.

DETAILED DESCRIPTION

Figure 1:
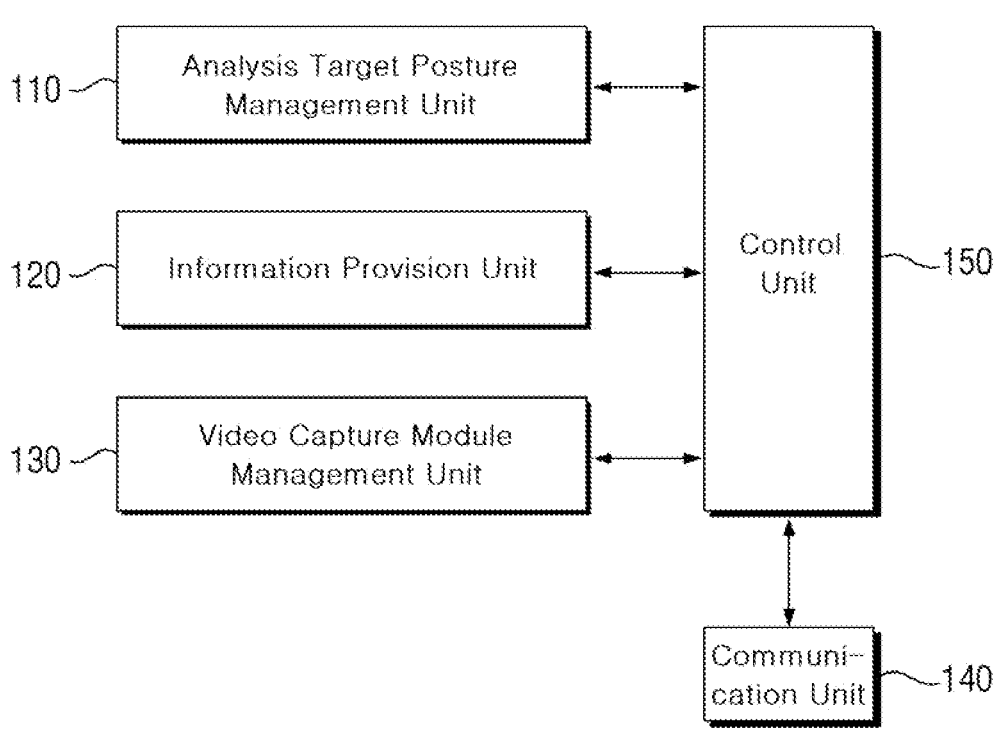
FIG. 1 specifically shows the internal configuration of a device according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although embodiments related to a golf swing are described herein focusing on a full swing, the golf swing according to the invention should be understood in the broadest sense as encompassing all motions for moving a golf club. For example, the golf swing according to one embodiment of the invention may include a full swing, a half swing, a chip shot, a lobe shot, and a putt.

Although the descriptions herein are focused on golf, it will be apparent to those skilled in the art that the present invention may be utilized even for estimating information on motions performed in sports other than golf. For example, the present invention may be utilized for estimating information on a baseball swing or information on a workout or yoga posture.

Although the descriptions herein are focused on detecting joints from a video of a user's golf swing for ease of understanding, it should be understood that the present invention is not limited to detecting joints and may be utilized even for detecting body parts other than joints.

Configuration of a Device

Hereinafter, the internal configuration of a device 100 crucial for implementing the invention and the functions of the respective components thereof will be discussed.

FIG. 1 specifically shows the internal configuration of the device 100 according to one embodiment of the invention.

As shown in FIG. 1, the device 100 according to one embodiment of the invention may comprise an analysis target posture management unit 110, an information provision unit 120, a video capture module management unit 130, a communication unit 140, and a control unit 150. According to one embodiment of the invention, at least some of the analysis target posture management unit 110, the information provision unit 120, the video capture module management unit 130, the communication unit 140, and the control unit 150 may be program modules to communicate with an external system (not shown). The program modules may be included in the device 100 in the form of operating systems, application program modules, or other program modules, while they may be physically stored in a variety of commonly known storage devices. Further, the program modules may also be stored in a remote storage device that may communicate with the device 100. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the device 100 has been described as above, and it will be apparent to those skilled in the art that at least a part of the components or functions of the device 100 may be implemented in a server (not shown) or included in an external system (not shown), as necessary.

Meanwhile, the device 100 according to one embodiment of the invention is digital equipment having a memory means and a microprocessor for computing capabilities, and may include smart phones, tablets, smart watches, smart bands, smart glasses, desktop computers, notebook computers, workstations, personal digital assistants (PDAs), web pads, and mobile phones. However, the device 100 is not limited to the examples mentioned above, and may be changed without limitation as long as the objects of the invention may be achieved.

In particular, the device 100 may include an application (not shown) for assisting a user to receive services such as estimation of information on a golf swing from the device 100. The application may be downloaded from an external application distribution server (not shown). Meanwhile, the characteristics of the application may be generally similar to those of the analysis target posture management unit 110, the information provision unit 120, the video capture module management unit 130, the communication unit 140, and the control unit 150 of the device 100 to be described below. Here, at least a part of the application may be replaced with a hardware device or a firmware device that may perform a substantially equal or equivalent function, as necessary.

First, the analysis target posture management unit 110 according to one embodiment of the invention may function to specify at least one analysis target posture from among a plurality of golf swing-related postures.

Specifically, according to one embodiment of the invention, the plurality of golf swing-related postures may include a number of postures that a user may take when performing a golf swing. In particular, according to one embodiment of the invention, the plurality of golf swing-related postures may refer to a number of problems that may occur in the user's golf swing. For example, according to one embodiment of the invention, the problems may include a head-up, early extension, sway, and chicken wing. However, the plurality of golf swing-related postures according to one embodiment of the invention are not limited to those listed above, and may be diversely changed as long as the objects of the invention may be achieved.

Further, according to one embodiment of the invention, the analysis target posture may refer to any posture selected by the user from among the plurality of golf swing-related postures. For example, according to one embodiment of the invention, when a user intends to practice fixing a head-up, which is one of the problems occurring in his/her golf swing, the user may select a head-up from among the plurality of golf swing-related postures. Then, the analysis target posture management unit 110 according to one embodiment of the invention may specify the head-up selected by the user as the analysis target posture.

Further, according to one embodiment of the invention, one or more analysis target postures may be specified. According to one embodiment of the invention, when the user selects a specific problem as an analysis target posture, the analysis target posture management unit 110 according to one embodiment of the invention may cause a golf-swing related posture associated with the selected problem to be further included in the analysis target postures.

Meanwhile, the analysis target posture management unit 110 according to one embodiment of the invention may function to specify the analysis target posture with reference to information on a coach selected by the user from among a plurality of golf coaches.

Specifically, the analysis target posture management unit 110 according to one embodiment of the invention may provide the user with information on a plurality of golf coaches. According to one embodiment of the invention, information on a golf coach may include the golf coach's coaching style, coaching specialty, and the like. Then, when a coach is selected by the user from among the plurality of golf coaches, the analysis target posture management unit 110 according to one embodiment of the invention may specify the user's analysis target posture with reference to the information on the selected coach (specifically, coaching specialty). However, the information on the golf coach according to one embodiment of the invention is not limited to those listed above, and may be diversely changed as long as the objects of the invention may be achieved.

Further, according to one embodiment of the invention, the golf coach selectable by the user may be a real golfer but may also be a virtual coach (e.g., an artificial intelligence coach) that does not actually exist, and may be diversely changed as long as the objects of the invention may be achieved.

Figure 3:
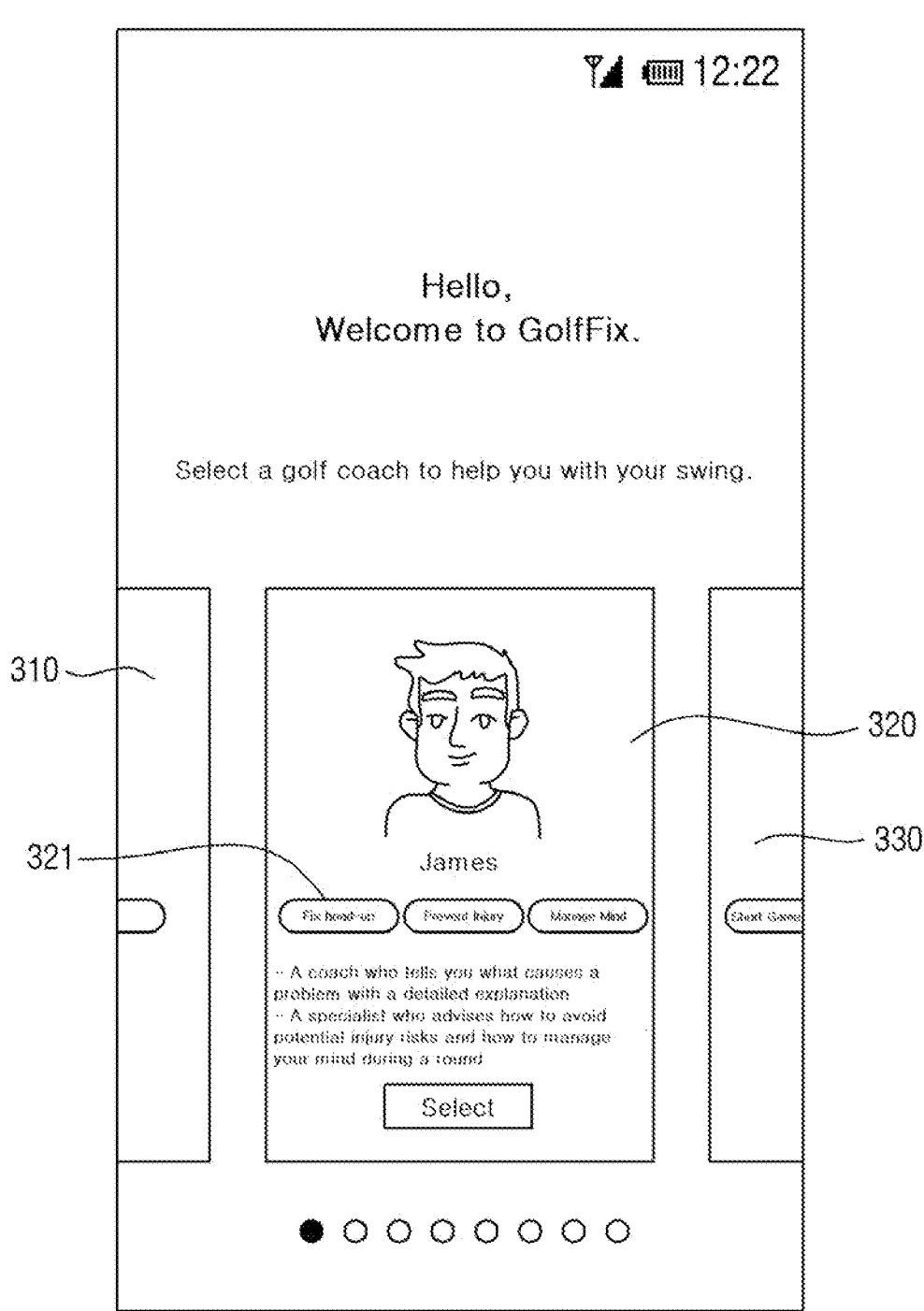
FIG. 3 illustratively shows how to specify a user's analysis target posture according to one embodiment of the invention.

FIG. 3 illustratively shows how to specify a user's analysis target posture according to one embodiment of the invention.

For example, referring to FIG. 3, the analysis target posture management unit 110 according to one embodiment of the invention may provide the user with information on a plurality of golf coaches 310, 320 and 330. According to one embodiment of the invention, when the user selects "James" from among the plurality of golf coaches, the analysis target posture management unit 110 according to one embodiment of the invention may specify the user's analysis target posture as an head-up with reference to the information on "James" (specifically, coaching specialty 321).

However, the method of specifying the user's analysis target posture according to one embodiment of the invention is not limited to the foregoing, and may be diversely changed to, for example, a method of specifying a posture selected by the user (e.g., the posture may be provided to the user in the form of a list) as the analysis target posture regardless of the information on the golf coach, or a method of analyzing a video of the user's golf swing to estimate a problem of the user and specify the estimated problem as the analysis target posture, as long as the objects of the invention may be achieved.

Next, the information provision unit 120 according to one embodiment of the invention may function to detect at least one of at least one joint of a user and a golf club using an artificial neural network model from a video of the user's golf swing captured by a video capture module.

Specifically, according to one embodiment of the invention, the video capture module (not shown) may refer to an apparatus that is a part of the device 100 and functions to capture the video of the user's golf swing (e.g., a camera of a cell phone), or may refer to another capture apparatus that is distinct from the device 100. Further, the video capture module management unit 130 according to one embodiment of the invention may control the video capture module to capture the video of the user's golf swing.

Figure 4:
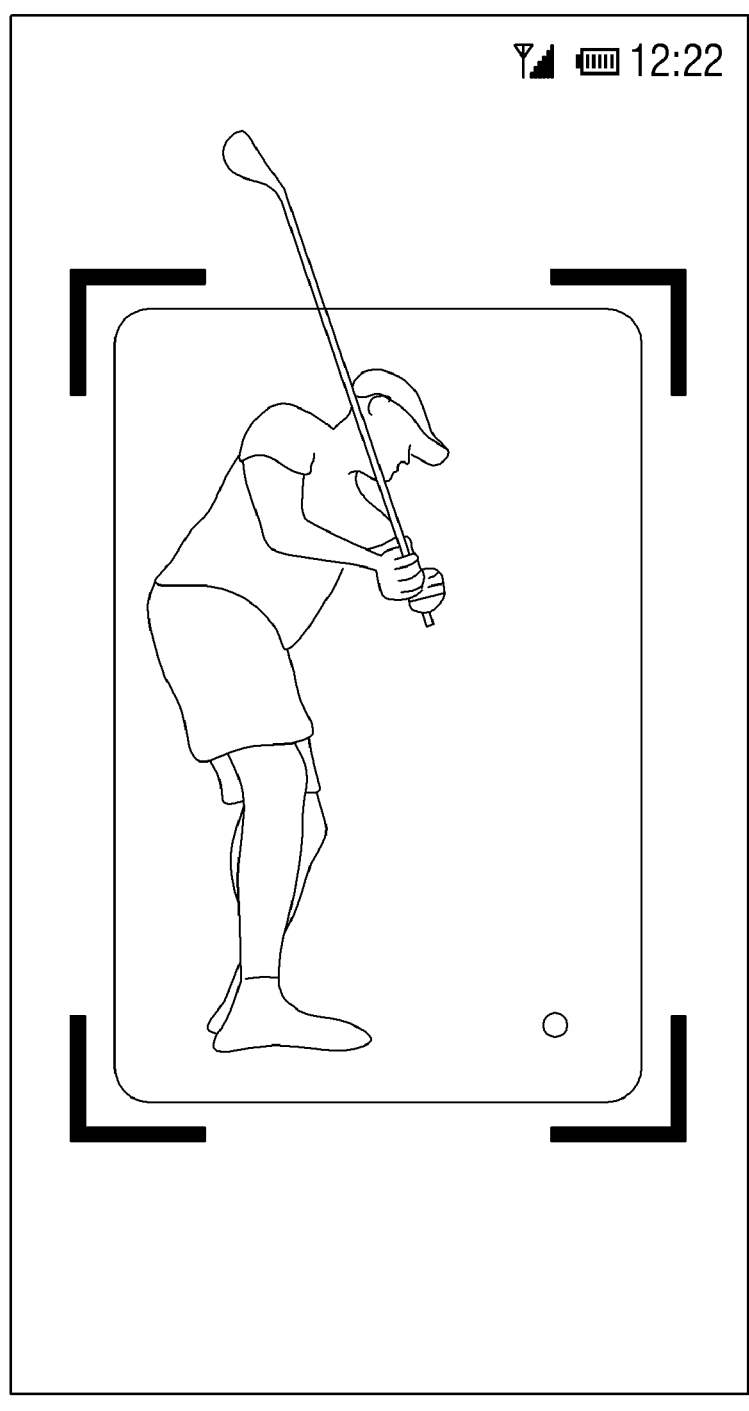
FIG. 4 illustratively shows how to capture a video of a user's golf swing according to one embodiment of the invention.

FIG. 4 illustratively shows how to capture a video of a user's golf swing according to one embodiment of the invention.

Referring to FIG. 4, according to one embodiment of the invention, the video of the user's golf swing may be captured in a direction to view a direction in which the user intends to fly a golf ball. According to one embodiment of the invention, the video of the user's golf swing may be captured in a direction opposite to the above direction or in a direction to view the front of the user.

Further, according to one embodiment of the invention, the video capture module management unit 130 according to one embodiment of the invention may allow the user to predetermine a direction in which the video of the golf swing is captured. Furthermore, the video capture module management unit 130 according to one embodiment of the invention may determine a preferred direction in which the video of the user's golf swing is to be captured, on the basis of the user's analysis target posture specified by the analysis target posture management unit 110 according to one embodiment of the invention, and notify the user of the determined direction to induce the video of the user's golf swing to be captured in the determined direction.

Further, the information provision unit 120 according to one embodiment of the invention may derive probability information on at least one of a position of at least one joint of a user and a position of a golf club using an artificial neural network model from a video of the user's golf swing captured by the video capture module, and detect at least one of the at least one joint of the user and the golf club from the video with reference to the probability information.

Furthermore, the information provision unit 120 according to one embodiment of the invention may generate a probability map (i.e., output data of the artificial neural network model) using the video of the user's golf swing as input data of the artificial neural network model.

For example, according to one embodiment of the invention, the probability map may be a two-dimensional heat map. Further, the information provision unit 120 according to one embodiment of the invention may generate at least one two-dimensional heat map image for each of the at least one joint of the user using the artificial neural network model, and may derive the probability information on the two-dimensional position of the at least one joint of the user on the basis of properties such as the two-dimensional position of the at least one joint being more likely to correspond to pixels with larger values, among pixels constituting the generated at least one heat map image, or the position of the at least one joint being less likely to be accurately specified as pixels with small values are widely distributed in the heat map, and being more likely to be accurately specified as pixels with large values are narrowly distributed in the heat map.

Meanwhile, the above-described manner of deriving the probability information on the position of the at least one joint of the user may be similarly applied to the case where the information provision unit 120 according to one embodiment of the invention detects the golf club, and thus a detailed description thereof will be omitted.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one of at least one joint of a user and a golf club may be detected from a video of the user's golf swing.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size 1×1×M (i.e., a kernel of width 1, height 1, and depth M) is applied for each point of an input layer, in performing convolution in the artificial neural network model according to one embodiment of the invention.

Figure 2A:
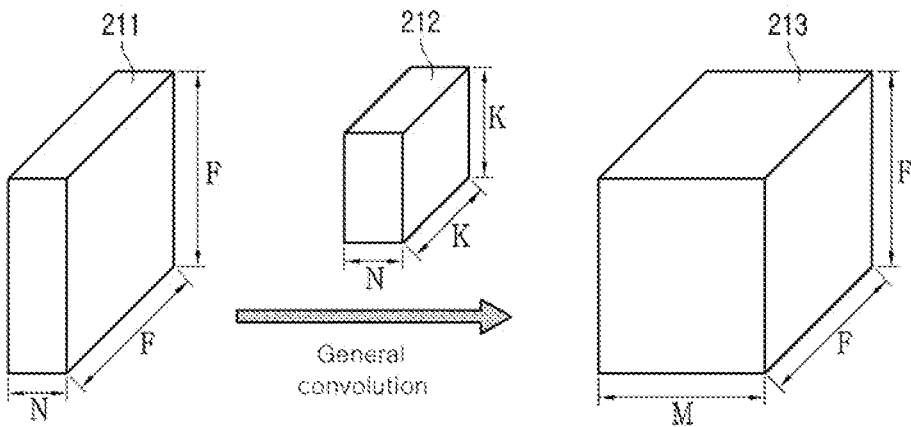
FIG. 2A illustratively shows how general convolution is performed according to one embodiment of the invention.

FIG. 2A illustratively shows how general convolution is performed according to one embodiment of the invention.

Figure 2B:
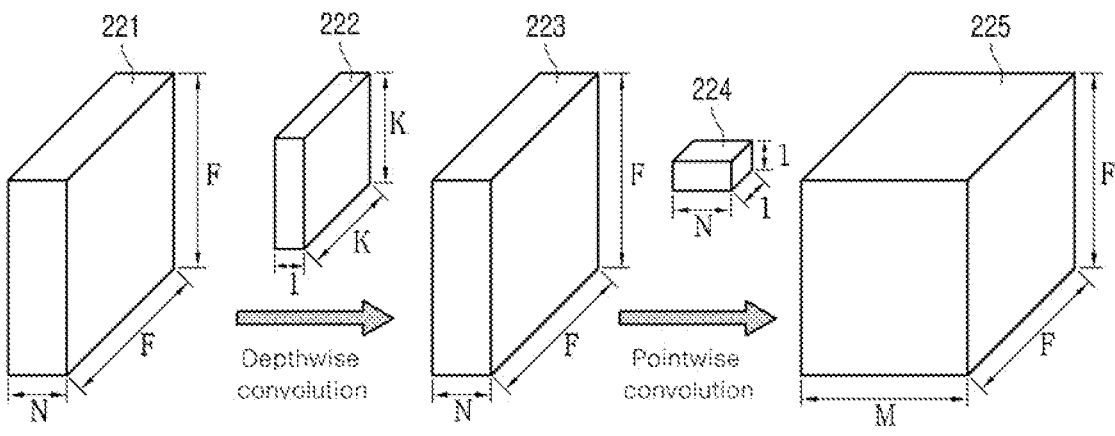
FIG. 2B illustratively shows how depthwise convolution and pointwise convolution are performed according to one embodiment of the invention.

FIG. 2B illustratively shows how depthwise convolution and pointwise convolution are performed according to one embodiment of the invention.

Referring to FIG. 2A, according to one embodiment of the invention, it may be assumed that the width, height, and depth of an input layer 211 are F, F, and N, respectively; the width, height, and depth of each kernel 212 are K, K, and N, respectively; and the width, height, and depth of an output layer 213 are F, F, and M, respectively. Here, it is assumed that padding and stride are appropriately sized such that there is no change in the width and height of the input layer 211 and the output layer 213. In this case, in the general convolution, the kernel 212 is applied to the input layer 211 to constitute one depth of the output layer 213 (through F×F×K×K×N operations), and these operations are performed for M kernels 212 so that a total of F×F×K×K×N×M operations are performed.

Referring to FIG. 2B, according to one embodiment of the invention, it may be assumed that the width, height, and depth of an input layer 221 are F, F, and N, respectively; the width, height, and depth of each kernel 222 in the depthwise convolution are K, K, and 1, respectively; the width, height, and depth of each kernel 224 in the pointwise convolution are 1, 1, and N, respectively; and the width, height and depth of an output layer 225 are F, F, and M, respectively. In this case, the kernel 222 is applied for each depth of the input layer 221 to constitute each depth of an intermediate layer 223 (through F×F×K×K×1×N operations). Then, the kernel 224 is applied for each point of the intermediate layer 223 to constitute one depth of the output layer 225 (through F×F×1×1×N operations), and these operations are performed for M kernels 224 so that a total of F×F×1×1×N×M operations are performed in the pointwise convolution. Therefore, according to one embodiment of the invention, a total of (F×F×K×K×1×N)+(F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Meanwhile, the information provision unit 120 according to one embodiment of the invention may function to estimate information on the user's analysis target posture with reference to at least one of a position of the at least one joint of the user and a position of the golf club detected from the video of the user's golf swing, and provide the user with the estimated information on the user's analysis target posture.

Specifically, the information provision unit 120 according to one embodiment of the invention may determine whether the user has completed one golf swing with reference to at least one of a position of the at least one joint of the user and a position of the golf club detected from the video of the user's golf swing. Then, the information provision unit 120 according to one embodiment of the invention may estimate information on the user's analysis target posture each time the user completes one golf swing, and provide the user with the estimated information.

For example, when the user's golf swing is a full swing, the information provision unit 120 according to one embodiment of the invention may specify frames corresponding to an address posture and a finish posture, respectively, with reference to at least one of a position of the at least one joint of the user and a position of the golf club detected from the video of the user's golf swing. Then, the information provision unit 120 according to one embodiment of the invention may estimate information on the user's analysis target posture by cropping a video containing the frame corresponding to the address posture up to the frame corresponding to the finish posture (i.e., a part of the entire captured video corresponding to one golf swing), and analyzing the cropped video using an artificial neural network model.

Further, according to one embodiment of the invention, the information on the user's analysis target posture may include information on whether the analysis target posture occurred in the user's golf swing, an extent of occurrence of the analysis target posture when the analysis target posture occurred in the user's golf swing, a problem in the user's golf swing associated with the analysis target posture, an assessment of the user's golf swing, a lesson content associated with the analysis target posture, and the like.

More specifically, the lesson content associated with the user's analysis target posture may include a text lesson (e.g., the text "Keep your eye on the ball." is displayed on a display of the device 100), a voice lesson (e.g., the voice "Try swinging while keeping your eye on the ball. It will help you fix the head-up." is outputted), a drill video lesson (e.g., a video of a golfer who swings while keeping his/her eye on the ball is played), and the like. Here, the information provision unit 120 according to one embodiment of the invention may use a rule-based algorithm or the like to determine the lesson content to be provided to the user with reference to the information on the user's analysis target posture and information on the user (e.g., gender, age, number of hits, and years of experience).

FIGS. 5A and 5B illustratively show how to provide information on a user's analysis target posture according to one embodiment of the invention.

For example, according to one embodiment of the invention, it may be assumed that when the user's analysis target posture is specified as a head-up, the user has performed one golf swing and a severe head-up has occurred in the swing. In this case, referring to FIG. 5A, the information provision unit 120 according to one embodiment of the invention may provide information on the user's head-up via the display of the device 100. Specifically, the information provision unit 120 according to one embodiment of the invention may provide the user with information on an assessment of the user's swing according to the extent of occurrence of the head-up (e.g., 3.7 out of 10), whether the head-up has occurred 512, a problem in the user's golf swing associated with the head-up 511, and the like. Here, the information provision unit 120 according to one embodiment of the invention may cause the information on whether the head-up has occurred 512 and the problem in the user's golf swing associated with the head-up 511 to be differently displayed depending on the extent of occurrence of the head-up (e.g., the window for the information 512 may be displayed in a darker color as the extent of occurrence of the head-up is greater).

Continuing with the example, according to one embodiment of the invention, it may be assumed that after the above swing, the user has performed another golf swing and no or a weak head-up has occurred in the swing. In this case, referring to FIG. 5B, the information provision unit 120 according to one embodiment of the invention may provide information on the user's head-up via the display of the device 100. Specifically, the information provision unit 120 according to one embodiment of the invention may provide the user with information on an assessment of the user's swing according to the extent of occurrence of the head-up (e.g., 8.2 out of 10), whether the head-up has occurred 522, a problem in the user's golf swing associated with the head-up 521, and the like.

Meanwhile, the information on the user's analysis target posture according to one embodiment of the invention and the manner of providing the user with the information are not limited to the foregoing, and may be diversely changed as long as the objects of the invention may be achieved. For example, when providing a user with information on the user's analysis target posture, the information provision unit 120 according to one embodiment of the invention may provide information on the analysis target posture estimated for the last few golf swings, in addition to information on the analysis target posture estimated for the current golf swing.

Meanwhile, when the capture of the video of the user's golf swing is finished, the information provision unit 120 according to one embodiment of the invention may function to further provide the user with information on the user's analysis target posture estimated while the video of the user's golf swing is captured.

Specifically, the information provision unit 120 according to one embodiment of the invention may provide the user with information on the user's analysis target posture each time the user performs a golf swing, so that the user may repeatedly practice a desired posture without the inconvenience of checking the video of the golf swing or manipulating the device each time the user performs the golf swing.

Further, the information provision unit 120 according to one embodiment of the invention may accumulate and manage the information on the user's analysis target posture provided to the user while the video of the user's golf swing is captured. Then, when the user's golf swing is repeated for or above a predetermined number of times, or when the user finishes the video capture to stop practicing, the information provision unit 120 according to one embodiment of the invention may collect and provide the accumulated information to the user.

For example, the information provision unit 120 according to one embodiment of the invention may provide the user with information on a total number of swings of the user, a number of times the analysis target posture occurs out of the total number of swings, and a comprehensive assessment of the user's swing according to an extent of occurrence of the analysis target posture. Further, the information provision unit 120 according to one embodiment of the invention may provide the user with a lesson content associated with the analysis target posture on the basis of the accumulated information.

Meanwhile, the information provision unit 120 according to one embodiment of the invention may function to further provide the user with a frame associated with the user's analysis target posture among a plurality of frames constituting the video of the user's golf swing.

For example, when the user's analysis target posture is a head-up, the information provision unit 120 according to one embodiment of the invention may extract and provide the user with a frame corresponding to a scene in which the head-up occurs (or occurs most severely) from the plurality of frames constituting the video of the user's golf swing. As a result, the user may identify a problem in the user's swing by simply checking the scene (or frame) provided via the display of the device 100, without having to search for any problematic part in the video of the user's swing each time the user performs a golf swing.

Next, the video capture module management unit 130 according to one embodiment of the invention may function to control the video capture module to capture the video of the user's golf swing again after a predetermined time elapses from when the information on the user's analysis target posture is provided by the information provision unit 120 according to one embodiment of the invention.

Specifically, in order to assist the user to repeatedly practice a desired posture without the inconvenience of checking the video of the user's golf swing or manipulating the device 100 each time the user performs a golf swing, the video capture module management unit 130 according to one embodiment of the invention may control the video capture module to automatically capture the video of the user's golf swing again after a predetermined time elapses from when the information on the user's analysis target posture is provided. Here, according to one embodiment of the invention, the predetermined time may not be uniformly determined, but may be adaptively determined according to the information on the analysis target posture provided to the user and the user's response to the information.

For example, when the user is provided with a text (or voice) lesson as the information on the analysis target posture as the user performs a golf swing, the video capture module management unit 130 according to one embodiment of the invention may control the video capture module to automatically capture the user's golf swing after a predetermined time (e.g., 3 seconds) elapses from when the provision of the lesson is completed. Here, the video capture module management unit 130 according to one embodiment of the invention may provide the user with information on when to capture the user's golf swing again (e.g., "Swing again in 3 seconds.").

As another example, when the user is provided with a drill video lesson together with a text (or voice) lesson as the information on the analysis target posture as the user performs a golf swing, the video capture module management unit 130 according to one embodiment of the invention may determine when to capture the user's golf swing again according to whether the user watches the drill video lesson. That is, if the user does not watch the drill video lesson, the video capture module management unit 130 according to one embodiment of the invention may control the video capture module to automatically capture the user's golf swing after a predetermined time (e.g., 3 seconds) elapses from when the provision of the lessons is completed. Further, if the user watches the drill video lesson, the video capture module management unit 130 according to one embodiment of the invention may control the video capture module to automatically capture the user's golf swing after a predetermined time (e.g., 3 seconds) elapses from when the user completes watching the drill video lesson.

Next, the communication unit 140 according to one embodiment of the invention may function to enable data transmission/reception from/to the analysis target posture management unit 110, the information provision unit 120, and the video capture module management unit 130.

Lastly, the control unit 150 according to one embodiment of the invention may function to control data flow among the analysis target posture management unit 110, the information provision unit 120, the video capture module management unit 130, and the communication unit 140. That is, the control unit 150 according to the invention may control data flow into/out of the device 100 or data flow among the respective components of the device 100, such that the analysis target posture management unit 110, the information provision unit 120, the video capture module management unit 130, and the communication unit 140 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a mobile device for estimating information on a golf swing, the method comprising the steps of:

specifying at least one analysis target posture from among a plurality of golf swing-related postures;

light-weighting an artificial neural network model using depthwise convolution and pointwise convolution to obtain a light-weighted artificial neural network model, wherein a depth of each kernel in the depthwise convolution is reduced to 1 and each of a width and a height of each kernel in the pointwise convolution is reduced to 1;

detecting at least one of a golf club and at least one joint of a user using the light-weighted artificial neural network model from a video of a golf swing of the user captured by a video capture module, and providing the user with information on an analysis target posture of the user estimated with reference to at least one of a position of the at least one joint and a position of the golf club; and controlling the video capture module to capture the video of the golf swing of the user again after a predetermined time elapses from when the information on the analysis target posture is provided.

2. The method of claim 1, further comprising the step of:

when the capture of the video of the golf swing of the user is finished, providing the user with the information on the analysis target posture estimated while the video of the golf swing of the user is captured.

3. The method of claim 1, wherein in the providing step, the user is further provided with a frame associated with the analysis target posture among a plurality of frames constituting the video.

4. The method of claim 1, wherein the information on the analysis target posture includes a lesson content associated with the analysis target posture.

5. The method of claim 1, wherein in the specifying step, the analysis target posture is specified with reference to information on a coach selected by the user from among a plurality of golf coaches.

6. A non-transitory computer-readable recording medium having stored thereon a computer program for causing a mobile device for estimating information on a golf swing to:

specify at least one analysis target posture from among a plurality of golf swing-related postures;

light-weight an artificial neural network model using depthwise convolution and pointwise convolution to obtain a light-weighted artificial neural network model, wherein a depth of each kernel in the depthwise convolution is reduced to 1 and each of a width and a height of each kernel in the pointwise convolution is reduced to 1;

detect at least one of a golf club and at least one joint of a user using the light-weighted artificial neural network model from a video of a golf swing of the user captured by a video capture module, and provide the user with information on an analysis target posture of the user estimated with reference to at least one of a position of the at least one joint and a position of the golf club; and control the video capture module to capture the video of the golf swing of the user again after a predetermined time elapses from when the information on the analysis target posture is provided.

7. A mobile device for estimating information on a golf swing, the mobile device comprising an application configured to:

specify at least one analysis target posture from among a plurality of golf swing-related postures;

light-weight an artificial neural network model using depthwise convolution and pointwise convolution to obtain a light-weighted artificial neural network model, wherein a depth of each kernel in the depthwise convolution is reduced to 1 and each of a width and a height of each kernel in the pointwise convolution is reduced to 1;

detect at least one of a golf club and at least one joint of a user using the light-weighted artificial neural network model from a video of a golf swing of the user captured by a video capture module, and provide the user with information on an analysis target posture of the user estimated with reference to at least one of a position of the at least one joint and a position of the golf club; and control the video capture module to capture the video of the golf swing of the user again after a predetermined time elapses from when the information on the analysis target posture is provided.

8. The mobile device of claim 7, wherein the application is configured to, when the capture of the video of the golf swing of the user is finished, further provide the user with the information on the analysis target posture estimated while the video of the golf swing of the user is captured.

9. The mobile device of claim 7, wherein the application is configured to further provide the user with a frame associated with the analysis target posture among a plurality of frames constituting the video.

10. The mobile device of claim 7, wherein the information on the analysis target posture includes a lesson content associated with the analysis target posture.

11. The mobile device of claim 7, wherein the application is configured to specify the analysis target posture with reference to information on a coach selected by the user from among a plurality of golf coaches.

* * * * *